United States Patent

[11] 3,591,847

| [72] | Inventors | Richard M. Donnell;<br>John D. Hamilton, both of Columbus, Ind. |
|---|---|---|
| [21] | Appl. No. | 763,070 |
| [22] | Filed | Sept. 27, 1968 |
| [45] | Patented | July 6, 1971 |
| [73] | Assignee | Cummins Engine Company, Inc.<br>Columbus, Ind. |

[54] PARALLEL OPERATION OF AC GENERATORS
21 Claims, 6 Drawing Figs.

[52] U.S. Cl. ..................................................... 307/87,
 317/19
[51] Int. Cl. .............................................. H02j 3/00
[50] Field of Search .......................................... 322/35, 37,
 94, 59; 317/19, 22, 13; 307/85, 86, 87, 56, 57

[56] References Cited
UNITED STATES PATENTS
1,782,514  11/1930  Seeley ............................ 307/85 X

| 2,285,208 | 6/1942 | Johntz et al. ................... | 317/19 X |
| 3,098,190 | 7/1963 | Spencer, Jr. et al. ............ | 317/19 X |
| 3,156,848 | 11/1964 | Wood ............................ | 317/19 |

Primary Examiner—Herman J. Hohauser
Attorney—Hibben, Noyes and Bicknell

ABSTRACT: Means for connecting an AC generator driven by a prime mover to an AC power transmission line and operating the generator or generators on the power line. Each generator is connected to the power line by first bringing the generator up to approximately synchronous speed, with the generator field deenergized, and then connecting the generator winding to the power line. The power line voltage pulls the generator into synchronism, and the generator field is then energized. Means is also provided automatically to prevent connection of the generator to the power line until a certain generator speed is reached, and automatically to disconnect the generator from the power line in the event the prime mover is shut down.

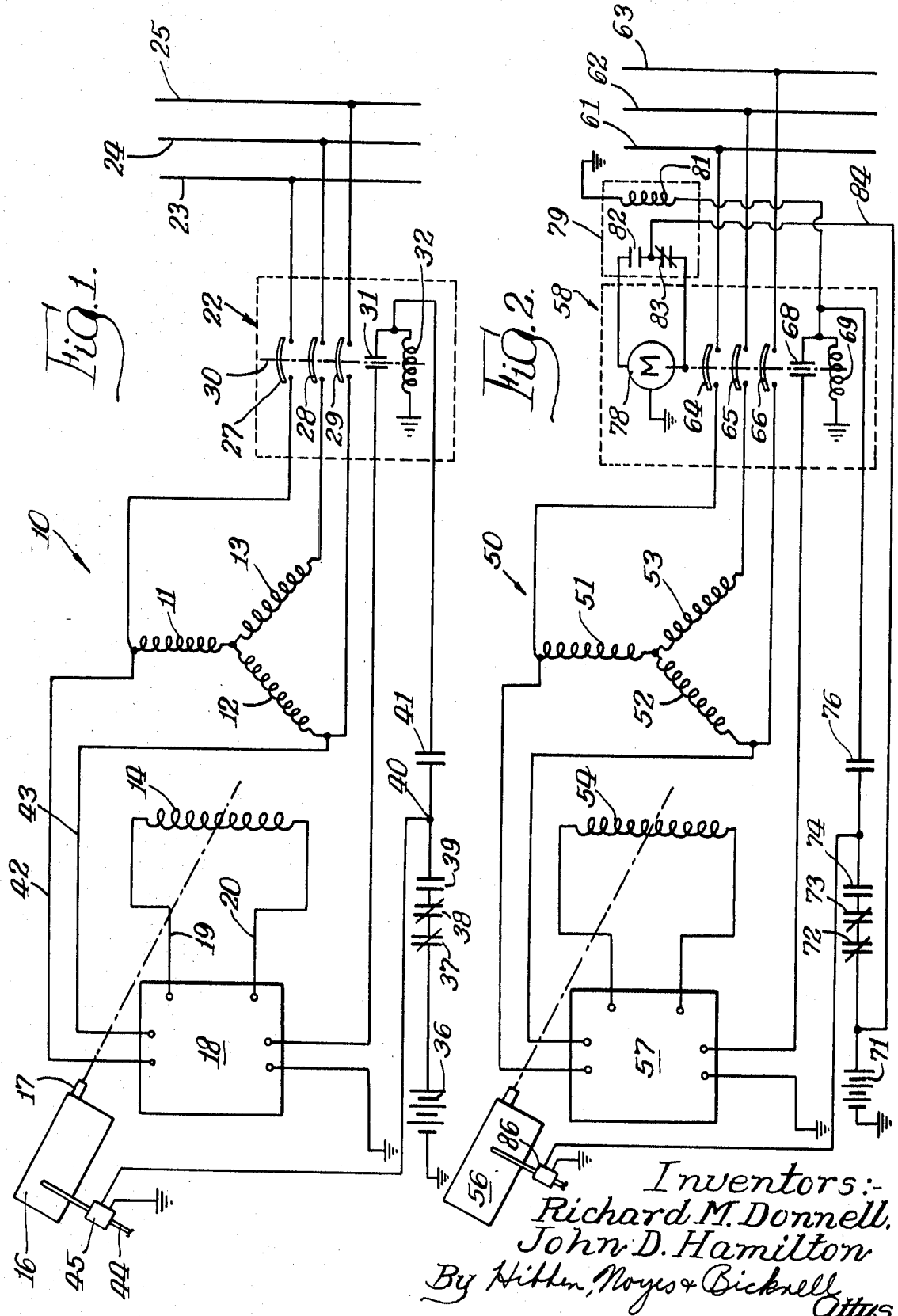

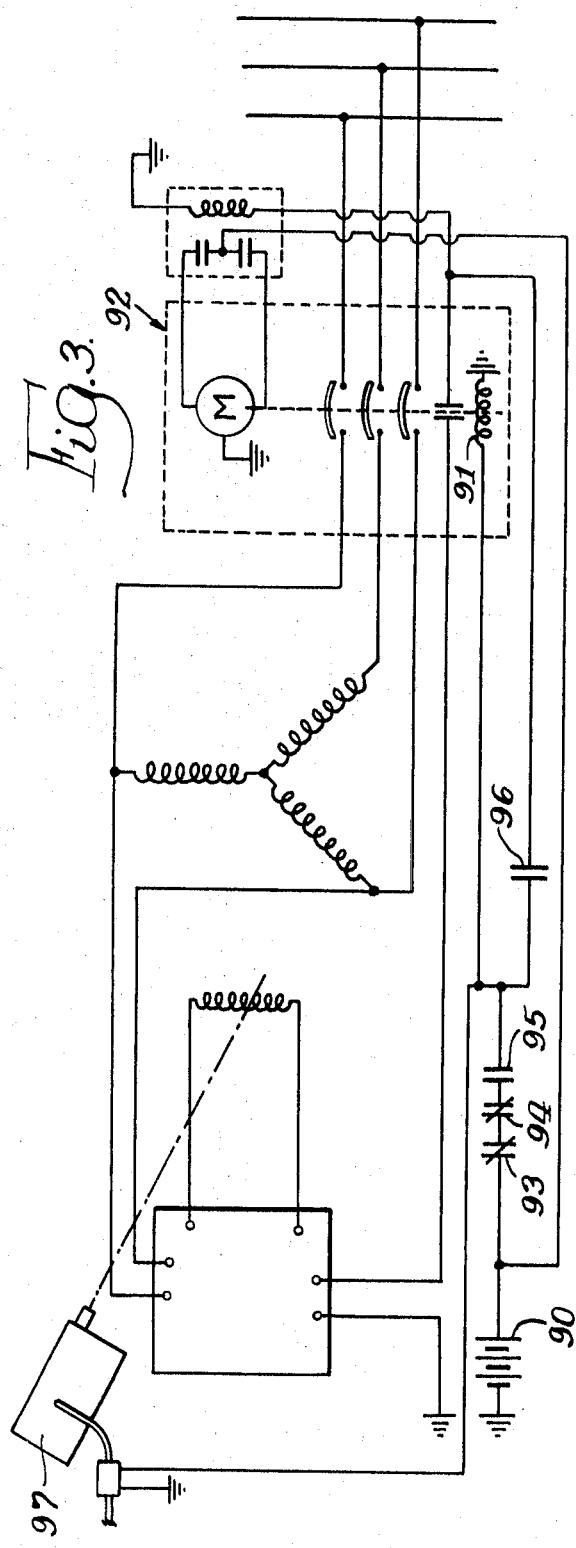
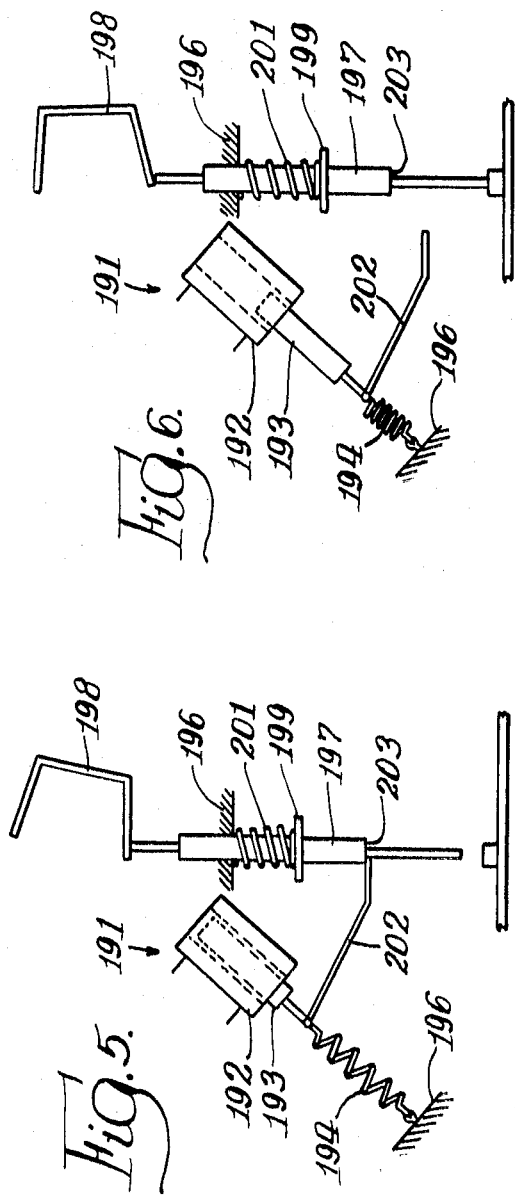

PARALLEL OPERATION OF AC GENERATORS

Systems for paralleling AC generators on a power transmission line and for controlling the generators once they are on the line have in the past tended to be expensive and complicated, usually requiring lights or meters to indicate the phases and magnitudes of the voltages. Some systems, such as the system shown in Reagan U.S. Pat. No. 1,675,381, include means for automatically connecting a generator to a power line, but such systems do not include sufficient safeguards to protect the apparatus during paralleling and operation.

In accordance with the present invention, a system is provided for connecting an AC generator to a power transmission line, the AC generator including generator power windings, field windings, and a rotor usually carrying the field winding. The system includes exciter means for energizing the field windings of the generator, a circuit breaker for connecting the generator power windings to the power transmission lines, a prime mover for driving the rotor, means responsive to the speed of the prime mover for enabling closure of said circuit breaker and for actuating the exciter means to energize the field windings, and means responsive to at least one operating characteristic of the prime mover and adapted to shut down the prime mover and to actuate the circuit breaker to disconnect the generator power windings from the power lines. When the speed of the prime mover is above a predetermined value, the circuit breaker may be closed manually or means may be provided for automatically closing the circuit breaker. In addition, two generator systems wherein the breakers are automatically closed may be connected to a deenergized power transmission line by using the power output from one generator to provide power for operating the circuit breakers of both systems.

Other objects and advantages of the present invention will be apparent from the following description taken in conjunction with the accompanying figures of the drawings, wherein:

FIG. 1 is a schematic diagram of a manual-automatic system embodying the invention;

FIG. 2 is a schematic diagram showing a fully automatic system embodying the invention;

FIG. 3 is a schematic diagram generally similar to FIG. 2 but showing an alternate form of the fully automatic system;

FIGS. 5 and 6 show a circuit breaker arrangement for use in a system embodying the invention.

Figure 4:
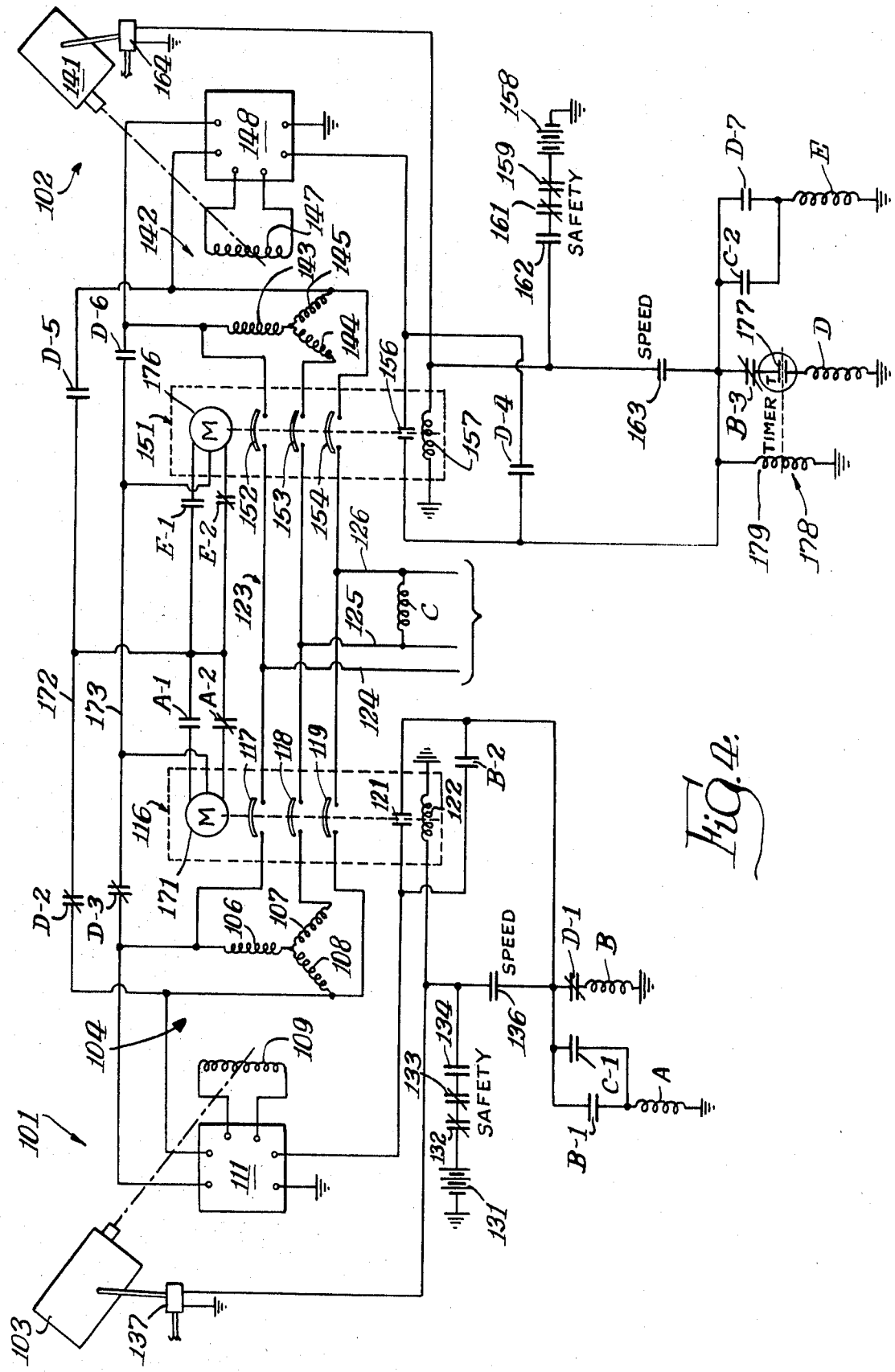
FIG. 4 is a schematic diagram showing a system embodying the invention, for connecting two generators to a power line.

The system illustrated in FIG. 1 comprises a generator 10 including three-phase windings 11, 12 and 13 which, in most generators, are fastened to the stator of the generator. The generator 10 further includes a field winding 14 which is normally fastened to and rotates with the rotor of the generator. A prime mover 16, such as a diesel engine, having a drive shaft 017 is mechanically coupled to turn the rotor and the field winding 14. The generator further includes an exciter-regulator circuit 18 connected by a pair of conductors 19 and 20 to energize the field winding 14.

The winding 11, 12 and 13 are connected through a circuit breaker 22 to three power lines 23, 24 and 25. The circuit breaker 22 includes three sets of contacts 27, 28 and 29 which are mechanically connected together by a trip bar 30 for simultaneous movement of the contacts between open and closed positions. The circuit breaker 22 further includes a normally open auxiliary contact 31 which is also mechanically connected to the trip bar 30 such that the contacts 31 close and open with the contacts 27 through 29. Further included in the circuit breaker 22 is an auxiliary coil 32 which is connected such that, when the coil 32 is energized, the contacts 27, 28, 29 and 31 may be closed, but when the coil 32 is not energized, the contacts 27, 28, 29 and 31 cannot be closed. Further, if the contacts are closed and the coil 32 is subsequently deenergized, the contacts will automatically open.

The system further comprises a DC battery 36 having one pole connected to ground and its other pole connected through three engine safety control switches 37, 38 and 39 and through an engine speed sensing switch 41 to one side of the auxiliary coil 32. The other side of the auxiliary coil 32 is also connected to ground, and consequently the coil 32 will be energized by the battery 36 when the four switches 37, 38, 39 and 41 are closed.

In addition to being connected to the auxiliary coil 32, the battery 36 is also connected through the four switches 37, 38, 39 and 41 and through the auxiliary contacts 31 to the exciter-regulator 18. The exciter-regulator 18 is also connected by a pair of conductors 42 and 43 across any two windings of the generator 10 such as the windings 11 and 12. The exciter-regulator 18 is a conventional type and is constructed such that, when the switches 31, 37, 38, 39 and 41 are closed, power from the battery 36 actuates a relay in the exciter-regulator 18, which closes a circuit to the field winding 14. If there is no AC voltage across the windings 11 and 12, the relay connects the winding 14 for energization by the battery 36. However, whenever there is an AC voltage across the windings 11 and 12, a rectifier in the exciter-regulator 18 rectifies this voltage and the relay connects the rectified voltage to the field winding 14.

As previously mentioned, the switch 41 is responsive to the speed of the prime mover 16 and it is open when the speed is below a predetermined level and it is closed when the speed is above this level. For example, if the synchronous speed of the generator 10 is 1800 r.p.m., the switch 41 may be designed to close when the prime mover speed is 1650 r.p.m. plus or minus 40 r.p.m. The three switches 37, 38 and 39 are arranged to respond to three different characteristics of the particular prime mover employed. In the present illustrative example, the prime mover 16 is a diesel engine and the switches 37, 38 and 39 respond to excessive overspeed, high coolant temperature, and low oil pressure. The switch 37 may be the overspeed responsive switch and is normally closed when the prime mover 16 is shut down and when it is operating at normal speeds. However, in the event the prime mover 16 were to run away and reach an excessively high speed substantially above the speed at which the switch 41 closes, the switch 37 would then automatically open. The switch 38 may be responsive to the temperature of the coolant for the prime mover 16, and the switch 38 would also normally be closed when the prime mover 16 is shut down and is operating normally. However, in the event the prime mover 16 were to overheat, the switch 38 would respond to the excessively high temperature and automatically open. The switch 39 may be connected to respond to the pressure of the lubricating oil. The switch 39 would normally be open when the prime mover 16 is shut down, and it would close only when the prime mover 16 is being started up and the lubricating oil pressure has reached a certain value.

The prime mover 16 is supplied with fuel through a fuel line 44, and a fuel control solenoid valve 45 is connected in the fuel line and permits fuel flow only when the solenoid is energized. The solenoid is connected between ground and the junction, indicated at 40, of the two switches 39 and 41, and thus the solenoid 45 will be energized by the battery 36 whenever the three switches 37, 38 and 39 are closed.

Considering the operation of the system shown in FIG. 1, assume that the power transmission lines 23, 24 and 25 are energized by an alternating current three-phase voltage. When the prime mover 16 is shut down, the switches 37 and 38 are closed, the switches 39, 41 and 31 are open, and the contacts 27, 28 and 29 are open. When the generator 10 is to be placed on the power lines 23, 24 and 25, the prime mover 16 is turned over. Such turn over creates oil pressure which closes the switch 39, and the solenoid valve 45 is energized, fuel flows through the line 44, and the prime mover starts. The generator rotor and the field winding 14 rotate, but at this time no voltage is generated in the generator windings 11, 12 and 13 because the field winding 14 is not energized. When a certain speed is reached, the switch 41 closes and a circuit is thus completed through the battery 36, the four closed switches 37, 38, 39 and 41 and through the auxiliary coil 32. Energization of the coil 32 does not effect closure of the circuit breaker contacts, but it does enable the contacts to be manually closed. The contacts of the circuit breaker 22 may thus be manually closed by an operator only after the prime mover has reached a certain speed. When the contacts 27, 28 and 29 are manually closed, the three generator windings 11, 12 and 13 are connected to the power transmission lines 23, 24 and 25, and consequently a rotating magnetic field is set up in the stator of the generator. The poles of the rotor line up with the rotating field set up by the windings 11, 12 and 13, and the poles of the rotor will be either electrically in-phase or 180 electrical degrees out of phase with the rotating field.

Closure of the contact 31 simultaneously with closure of the contacts 27, 28 and 29 connects the battery 36 to the exciter-regulator 18. Since a voltage exists across the windings 11 and 12, the battery 36 actuates the exciter-regulator 18 to connect the field winding 14 to receive rectified voltage from the windings 11 and 12. Energization of the field winding 14 results in magnetic polarization of the rotor, causing the rotor to be pulled into exact synchronization with the rotating field set up by the windings 11, 12 and 13. Of course, if the rotor poles were previously in exact synchronization with the rotating field, the rotor would not change its position with respect to the rotating magnetic field. Thereafter, in normal operation, the governor of the prime mover 16 would regulate the flow of fuel to the prime mover to cause additional power to be supplied by the prime mover 16 in order to drive the generator rotor and supply power to the power transmission lines 23, 24 and 25.

In the event a malfunction were to develop in the prime mover 16, it is important that the generator 10 be immediately disconnected from the power lines 23, 24 and 25. This is true because, if the generator 10 were to remain connected to the power lines 23, 24 and 25, the voltage on the lines 23, 24 and 25 would tend to drive the generator 10 as a motor and keep the prime mover 16 turning. A malfunction of the prime mover 16 would quickly result in opening of at least one of the three switches 37, 38 and 39. Such opening would effect deenergization of the solenoid 45 and shut down of the prime mover 16. Opening of any one of the switches 37, 38 and 39 would also immediately effect deenergization of the auxiliary coil 32 and actuation of the contacts 27, 28 and 29 of the circuit breaker 22 to their open position. The auxiliary contacts 31 would also open simultaneously with the other breaker contacts, and absence of power from the battery 36 to the exciter-regulator 18 would deenergize the field winding 14.

The system shown in FIG. 2 is generally similar in construction and operation to the system shown in FIG. 1. The principal difference is that the circuit breaker in the system shown in FIG. 2 is designed to be automatically closed when the engine reaches a predetermined speed, whereas the circuit breaker in the system shown in FIG. 1 must be manually closed.

The system shown in FIG. 2 includes a generator 50 comprising three windings 51, 52 and 53 and a field winding 54 which is normally mounted on the rotor of the generator. The rotor of the generator 50 is connected to be driven by a prime mover 56 such as a diesel engine, and the field winding 54 is connected to be energized by an exciter-regulator 57.

The three windings 51, 52 and 53 are connected by a circuit breaker 58 to three power transmission lines 61, 62 and 63. The circuit breaker 58 includes contacts 64, 65 and 66 which respectively connect the windings 51, 53 and 52 to the power lines 61, 62 and 63. The circuit breaker 58 further includes an auxiliary contact 68 and an auxiliary coil 69 which correspond and function similarly to the contact 31 and coil 32 of the system shown in FIG. 1. This system shown in FIG. 2 further includes a battery 71, three safety control switches 72, 73 and 74, and a speed sensitive switch 76, the foregoing switches corresponding to the four switches 37, 38, 39 and 41 of the system shown in FIG. 1.

To effect automatic closing of the circuit breaker contacts, the circuit breaker 58 further includes a reversible electric motor 78 which is connected to be energized by the battery 71 through a relay 79. The armature of the motor 78 is connected to the trip bar of the circuit breaker to open and close the breaker contacts and the contacts 68. The relay 79 includes a coil 81, normally open contacts 82, and normally closed contacts 83. The connection between the windings of the motor 78 and the battery 71 are such that, when the coil 81 is not energized, current flows from the battery 71, through a conductor 84, through the normally closed contacts 83, through the motor 78 and to ground. Current flowing in this direction through the motor 78 holds the contacts 64, 65, 66 and 68 in their open positions. However, in the event the coil 81 is energized, the contacts 82 are closed and the contacts 83 are opened, and current then flows from the battery 71, through the conductor 84, through the contacts 82 and through the motor 78. Current flows through the motor in this direction causes the contacts 64, 65, 66 and 68 to close.

The prime mover 56 also includes a solenoid fuel control valve 86 connected in the fuel line. The solenoid is connected between ground and the junction of the switches 74 and 76.

Considering the operation of the system shown in FIG. 2, the prime mover 56 is started and the switches 72, 73 and 74 close similar to the operation of the FIG. 1 system. Current from the battery 71 flows through the conductor 84, through the normally closed contacts 83 and through the motor 78, and holds the contacts 64, 65, 66 and 68 in their open positions. When a predetermined speed is reached, the engine speed sensing switch 76 also closes and the coil 69 is energized, thus permitting closure of the contacts 64, 65, 66 and 68. Closure of the switch 76 also completes a circuit from the battery 71, through the four switches 72, 73, 74 and 76, and through the relay coil 81 to ground. The contacts 82 are closed by the energized coil 81 and the contacts 83 are opened, and current flow through the conductor 84 and the closed contacts 82 causes the motor 78 to turn in the opposite direction and close the contacts 64, 65, 66 and 68. The three windings 51, 52 and 53 of the generator 50 are thus connected to the power transmission lines 61, 62 and 63, and a rotating field is set up in the generator stator as previously explained. Closure of the contacts 68 connects the battery 71 to the exciter-regulator 57 resulting in energization of the field winding 54.

It will be apparent that the system shown in FIG. 2 is completely automatic once the prime mover 56 has been started up. After the prime mover 56 has started and the generator 50 has been connected to the power lines, malfunction of the prime mover 56 will effect opening of one of the three switches 72, 73 and 74 and, as previously explained with regard to the system shown in FIG. 1, such opening shuts down the prime mover 56, deenergizes the coil 69, deenergizes the relay coil 81, opens the contacts 82 and closes the contacts 83. Current then again flows through the motor 78 in a direction to open the contacts 64, 65 66 and 68. Thus, the system shown in FIG. 2 provides automatic paralleling of the generator with the power lines 61, 62 and 63 once the prime mover 56 has been started, and it will automatically disconnect the generator from the power lines and shut down the prime mover in the event a malfunction develops in the prime mover 56.

The system shown in FIG. 3 is also a fully automatic system and is very similar in construction and operation to the system shown in FIG. 2. The principal difference between the FIG. 3 system and the FIG. 2 system lies in the connections between a battery 90 (FIG. 3) and an auxiliary coil 91 of a circuit breaker 92. Whereas in the FIG. 2 system, the coil 69 was connected to the battery 71 through the three engine safety control switches 72, 73, 74, and through the speed sensing switch 76, the coil 91 in the FIG. 3 system is connected to the battery 90 through only three engine safety control switches 93, 94 and 95 and not through a speed sensing switch 96. Consequently, the coil 91 will be energized and will enable closure of the contacts in the circuit breaker 92 as soon as a prime mover 97 of the FIG. 3 system has been started and the three switches 93, 94 and 95 have closed. Thus, the coil 91 will be energized prior to the time when the engine speed sensing switch 96 closes. The remainder of the operation of the FIG. 3 system is the same as that of the FIG. 2 system.

FIG. 4 shows a system including two generator units, each unit being generally similar to the system shown in FIG. 3. Each unit is arranged such that power generated thereby may be employed to actuate a circuit breaker motor of the unit, as contrasted with battery power as shown in FIG. 3. When two or more units are used, they are connected to a power transmission line and are interconnected such that power from one of the two generator units is employed to actuate the circuit breaker motors of both units. The system shown in FIG. 4, comprises a first engine-generator unit 101 and a second engine-generator unit 102, the unit 101 comprising a prime mover 103 and a generator 104. The generator 104 includes generator windings 106, 107 and 108, a field winding 109, and an exciter-regulator 111 connected to the field winding 109. The unit 101 further includes a motorized circuit breaker 116 including circuit breaker contacts 117, 118 and 119, a normally open auxiliary contact 121 and an auxiliary coil 122. The foregoing components are similar in construction and operation to the corresponding components in FIGS. 2 and 3. The three windings 106, 107 and 108 are adapted to be connected by the circuit breaker 116 to a bus 123 and to three power transmission lines 124, 125 and 126.

The unit 101 further comprises a starting battery 131, three safety control switches 132, 133 and 134, a speed responsive switch 136 which is connected to respond to the speed of the prime mover 103, and a solenoid actuated valve 137 which is connected in the fuel line of the prime mover 103. As in the previously described system, the switch 132 is normally closed and may respond to an overspeed condition of the prime mover 103, the switch 133 is also normally closed and is connected to respond to the water temperature of the prime mover 103, and the switch 134 is normally open when the engine is shut down and closes when the oil pressure of the prime mover 103 increases during start up.

The unit 102 comprises a prime mover 141, a generator 142 including three windings 143, 144 and 145, a field winding 147, and an exciter-regulator 148 connected to the field winding 147. The unit 102 further comprises a motorized circuit breaker 151 including contacts 152, 153 and 154 connected to the windings 143 through 145, normally open auxiliary contacts 156, and an auxiliary coil 157. Further included are an engine starting battery 158, three safety switches 159, 161 and 162, and a speed sensitive switch 163, the foregoing components being similar to those described with respect to the unit 101. The three windings 143, 144 and 145 are also adapted to be connected by the circuit breaker 151 and the bus 123 to the three power transmission lines 124, 125 and 126. The engine starting battery 158 is also connected through the three safety switches 159, 161 and 162 to a solenoid actuated fuel control valve 164 which is connected to control the flow of fuel to the prime mover 141.

The system shown in FIG. 4 further includes relays and relay contacts for controlling the paralleling operation of the two units 102 and 103 on the transmission lines 124, 125 and 126. Such relays comprise relay coils A, B, C, D and E. The relay coil A is connected through normally open contacts B-1 and C-1 of the coils B and C, respectively, to the speed responsive switch 136, the two normally open contacts B-1 and C-1 being connected in parallel. The relay coil B is connected through normally closed contacts D-1 of the relay D to the speed responsive switch 136. A normally open contact B-2 of the relay coil B is connected in parallel with the auxiliary contacts 121. The relay coil A controls the operation of a normally open contact A-1 and the normally closed contact A-2 which jointly control the operation of the motor 171 of the circuit breaker 116. The motor 171 is connected to be energized by two conductors 172 and 173, the two contacts A-1 and A-2 being connected between the motor 171 and the conductor 172 and the conductor 173 being connected to the common terminal of the motor 171. The two conductor 172 and 173 are respectively connected through normally closed contacts D-2 and D-3 of the relay coil D to two of the windings of the generator 104, in this instance the windings 106 and 108, and the conductors 172 and 173 are also connected through normally open contacts D-5 and D-6 of the coil D across two of the windings of the generator 142, in this instance the windings 143 and 145. The circuit breaker 151 also includes a motor 176 which has its common terminal connected to the conductor 173 and its other two terminals connected through a normally open contact E-1 and normally closed contacts E-2 of the relay coil E to the other conductor 172. The relay coil C is connected between the two transmission lines 125 and 126 so that the coil C will be energized whenever the power transmission lines are energized. The normally open contacts D-4 of the relay coil D are connected in parallel with the normally open auxiliary contacts 156. The relay coil E is connected through normally open contacts C-2 and D-7 of the coils C and D, respectively, to the speed responsive switch 163. The coil D is connected through normally closed contacts B-3 of the coil B and through the normally opened contacts 177 of a timer 178. The timer 178 further includes a coil 179 which has one side connected to a ground and its other side connected to the speed responsive switch 163.

Considering the operation of the system shown in FIG. 4, assume that the two prime movers 103 and 141 are shut down and that the power transmission lines 124, 125 and 126 are dead. In this condition, all of the relay coils are deenergized, the contacts 134 and 136 of the unit 101 are open, the contacts 162 and 163 of the unit 102 are also open, and the contacts of the two circuit breakers 116 and 151 are open. If the two prime movers 103 and 141 are turned over to start them up, either manually or automatically in response to a signal, the two oil pressure responsive switches 134 and 162 close. When the two prime movers 103 and 141 reach a predetermined speed, the two speed responsive switches 136 and 163 also close. A circuit through the timer coil 179 is then completed and the timer 178 begins its timing cycle. In addition, the relay coil B is energized through the closed switches 132, 133, 134 and 136, and through the normally closed contacts D-1. Energization of the coil B closes the contact B-1 and energizes relay coil A, closes contacts B-2 and thus actuates the exciter-regulator 111 of the unit 101, opens the normally closed contacts B-3 and thus prevents energization of the coil D. With the prime mover 103 driving the rotor of unit 101 and the exciter-regulator 111 energizing the field winding 109, a voltage is developed across the windings 106 and 108. Energization of the relay coil A closes the contacts A-1 and opens the contacts A-2, and the voltage generated by the windings 106 and 108 causes the motor 171 to be energized through the conductors 172 and 173 and the closed contacts A-1, thus closing the contacts 117, 118, 119, and 121 of the circuit breaker 116. With the circuit breaker 116 contacts closed, a voltage appears on bus 123 and on the power lines 124, 125 and 126, and the relay coil C is energized. Contacts C-1 then close and hold coil A energized, and contacts C-2 close and energize relay coil E. Energization of relay coil E causes contacts E-1 to close and energize the motor 176 of the circuit breaker 151 to close the contacts 152, 153 and 154 and 156. Prior to the time the circuit breaker 151 is energized, however, the exciter-regulator 148 of the unit 102 is not actuated because the contacts 156 are normally open and the relay coil D is deenergized due both to the open contacts B-3 of the energized coil B and the open contacts of the timer 178. However, as soon as the circuit breaker motor 176 is energized, the contacts 156 close and the exciter-regulator 148 energizes the field winding 147, and the generator 142 is placed in parallel with the generator 104 in the manner explained with regard to FIGS. 1, 2 and 3.

In the event the two prime movers 103 and 141 are signaled to start up but the primer mover 103 fails to start, the switches 162 and 163 for the unit 102 will close and start the cycle of the timer 178. The contacts B-3 will remain closed since the speed responsive switch 136 prevents energization of the coil B, and as soon as the timing period of the timer 178 is completed, the contacts 177 close and energize the coil D. Such energization of coil D opens contacts D-1 leading to the coil B, opens contacts D-2 and D-3 connected between the conductors 172 and 173 and the windings 106 and 108, closes contacts D-4 in order to actuate the exciter-regulator 148 to energize the field winding 147, closes the contacts D-5 and D-6 in order to energize the motor 176 to close the circuit breaker contacts 152, 153, 154 and 156, and closes the contacts D-7 in order to energize the coil E. Energization of coil E actuates the switch E-1 to its closed position in order to energize motor 176 to close contacts 152, 153 and 154 and place the windings 143, 144 and 145 on or across the power lines 124, 125 and 126. Relay coil C is then energized and closes contacts C-1 in order to enable energization of coil A in the event normally open contacts 134 and 136 are subsequently closed. Thereafter, if the cause of the failure to start of the prime mover 103 is determined and fixed, the prime mover 103 may be started and it will be automatically paralleled on the bus 123 with the generator of the unit 102 in the manner previously explained. Consequently, even though the prime mover 103 fails to start, the unit 102 will provide critical power so that critical loads may be operated until the second unit 101 comes into operation. In the event either prime mover 103 or 141 develops a malfunction during operation, the unit associated with that prime mover will be automatically shut down and disconnected from the power lines in the manner previously explained.

FIGS. 5 and 6 are schematic illustrations showing the interconnections between the auxiliary coil and the trip bar of the circuit breakers disclosed herein. Such a construction is commercially available from General Electric and is described in their Bulletin GEH-3318 entitled "Mounting Shunt Trip and Undervoltage Release Accessories, K1200 Line Breakers—Types TKM and THKM."

Briefly, the construction comprises a solenoid 191 including a coil 192 and an armature 193. The coil 192 corresponds to the auxiliary coils of the circuit breakers illustrated in FIGS. 1 to 4, and when the coil 192 is energized it tends to pull the armature 192 into it. A tension spring 194 is connected between the armature 193 and a stationary frame or support 196, the spring 194 exerting a force tending to pull the armature 193 out of the coil 192.

The construction further comprises a plunger shaft 197 having attached at one end thereof a tripping hook 198 which is adapted to engage the trip bar (not shown in FIGS. 5 and 6) of a circuit breaker. The plunger 198 has a ring 199 secured thereto and a compression spring 201 located between the ring 199 and the frame 196 urges the plunger 197 downwardly as seen in FIG. 5. The plunger 197 may be held upwardly by a latch 202 which has one end thereof secured to the plunger 193 and its other end adapted to engage the plunger 197. The plunger 197 has a shoulder 203 formed thereon which is adapted to be engaged by the latch 202 and held in the up position as seen in FIG. 5 when the armature 193 is drawn into the coil 192. When the plunger 197 and the hook 198 are in the up position, the circuit breaker contacts may be closed, and when they are in the down position shown in FIG. 6, the breaker contacts are open.

Assuming that the coil 192 is deenergized, the spring 194 pulls the armature 193 outwardly to the position shown in FIG. 6 where the latch 202 is out of engagement with the plunger 197, and the plunger is moved downwardly by the spring 201 and the circuit breaker contacts are open. When the coil 192 is energized, the armature 193 is pulled upwardly, the circuit breaker contacts may be closed, and the plunger 197 moves upwardly to the point where the latch 202 engages the shoulder 203 and holds the plunger 197 upwardly. However, if the coil 192 is subsequently deenergized, the armature 193 and the plunger 197 return to the positions shown in FIG. 5.

We claim:

1. A control system for an AC generator connected to be driven by a prime mover, said generator comprising power windings, field windings, and exciter means for controlling energization of said field windings, said system comprising circuit breaker means for connecting said power windings to AC power transmission lines, first switch means responsive to at least one operating characteristic of said prime mover and adapted to be actuated in response to malfunction in respect to said one operating characteristic of said prime mover, means acting in response to closure of said circuit breaker means for operating said exciter means at full level of energization, and enabling means cooperating with said circuit breaker means and responsive to said first switch means for enabling closure of said circuit breaker means in the absence of a malfunction in respect to said one operating condition and for opening said circuit breaker means if previously closed in the event of a malfunction in respect to said one operating characteristic of said prime mover.

2. Apparatus as in claim 1, and further including means responsive to actuation of said first switch means for shutting down said prime mover in the event of a malfunction in respect to said one operation characteristic of said prime mover.

3. Apparatus as in claim 1, and further including second switch means responsive to the speed of said prime mover and adapted to be actuated at above a predetermined speed, said enabling means being further responsive to said second switch and enabling closure of said circuit breaker means at speeds of said prime mover above said predetermined speed, and for opening said circuit breaker means if previously closed in the event the speed of said prime mover falls below said predetermined speed.

4. Apparatus as in claim 1, and further including battery means connected through said first switch means to said exciter means and to said enabling means for energizing said exciter means and said enabling means.

5. Apparatus as in claim 1, and further including second switch means responsive to the speed of said prime mover and adapted to be actuated at above a predetermined speed, and motor means responsive to said second switch for automatically effecting closure of said circuit breaker contacts at speeds of said prime mover above said predetermined speed.

6. Apparatus as in claim 5, and further including a battery connected to energize said motor means at speeds of said prime mover above said predetermined speeds.

7. Apparatus as in claim 5, wherein said motor means is adapted to be connected to receive power from said power windings of said generator.

8. Apparatus as in claim 5 and further including a second control system for a second generator connected to be driven by a second prime mover, said second generator and said second prime mover being substantially the same as said first generator and said first prime mover, said second system comprising circuit breaker contacts for connecting the power windings of said second generator to said power transmission lines, third switch means responsive to the speed of said second prime mover for energizing the field windings of said second generator when the speed of said second prime mover is above a predetermined level, and means connecting the power windings of said second generator to power said motor means.

9. Apparatus as in claim 8, wherein said second control system further includes motor means for actuating said circuit breaker contacts of said second system, said connecting means further connecting the power windings of said second generator to power said motor means of said second system.

10. Apparatus as in claim 9, and further including time delay means for connecting said motor means of said first system to be powered by the power windings of said first generator in the event said motor means of said first system does not receive power from the power windings of said first generator within a predetermined time after said first switch means has been actuated.

11. A system for paralleling an alternating current generator on an energized power line and for controlling operation of said generator after connection with the power line, said generator being driven by a prime mover and comprising power windings, field windings, and exciter means for energizing said field windings, said system comprising circuit breaker means connected between said power windings and said power lines, means acting in response to the speed of said prime mover for enabling closure of said circuit breaker means and for enabling operation of said exciter means at full level of energization, and means responsive to at least one operating characteristic of said prime mover and connected to open said circuit breaker contacts in the event previously closed and to shut down said prime mover in the event of malfunctioning of said prime mover.

12. Apparatus as in claim 11, wherein said speed responsive means comprises a switch which is closed only at speeds of the prime mover above a predetermined speed, and a coil in said circuit breaker which is energized when said speed responsive switch is closed, energization of said coil in said circuit breaker enabling closure of said circuit breaker contacts, and deenergization of said coil effecting opening of said contacts.

13. Apparatus as in claim 11, wherein said speed responsive means comprises a switch which is closed only at speeds of said prime mover above a predetermined speed and a coil in said circuit breaker means and said means responsive to at least one operating characteristic of said prime mover comprises a separate switch in series with said speed responsive switch, said operating characteristic responsive means being normally closed when said prime mover is operating normally, whereby said coil is energized when said prime mover is operating normally at above said predetermined speed, energization of said coil enabling closure of the circuit breaker means, and deenergization of said coil effecting opening of said circuit breaker means in the event it was previously closed.

14. Apparatus as in claim 11, and further including motor means for automatically closing and opening said circuit breaker means, said motor means being connected to close said circuit breaker means when said speed responsive means is actuated in response to operation of said prime mover at above said predetermined speed.

15. A system for controlling the operation of an AC generator connected to be driven by a prime mover, said generator comprising power windings, field windings, and exciter means for controlling energization of said field windings, said system comprising circuit breaker means adapted to be connected to the output of said power windings, motor means for opening and closing said circuit breaker means, conductor means adapted to form a circuit between said motor means and said power windings, and means responsive to the speed of said prime mover for actuating said exciter means to energize said field windings when the speed of said prime mover is above a predetermined value, whereby energization of said field windings induces a voltage in said power windings, and said voltage energizes said motor means to close said circuit breaker means.

16. Apparatus as in claim 15, and further including switch means connected in said conductor means for controlling current flow to said motor means, said switch means being arranged to be actuated by said speed responsive means to close said circuit to said motor means when the speed of said prime mover is above said predetermined value.

17. A system for controlling the operation of first and second AC generators connected to be driven by first and second prime movers, respectively, each of said generators comprising power windings, field windings, and exciter means for controlling energization of said field windings, said system comprising first circuit breaker means connected to the output of the power windings of said first generator, second circuit breaker means connected to the output of the power windings of said second generator, first and second motor means, for opening and closing said first and second circuit breaker means, respectively, means for actuating said exciter means of said first generator to energize said field windings of said first generator when the speed of said first prime mover is above a predetermined level, and conductor means connecting said power windings of said first generator to energize said first and second motor means, whereby said motor means close said circuit breakers when said first prime mover is operating above said predetermined speed and hence said field windings of said first generator are energized.

18. Apparatus as in claim 17, and further including means responsive to the speed of said second generator, normally open second switch means for actuating said exciter means of said second generator to energize said field windings of said second generator and for connecting when closed said power windings of said second generator to energize said second motor means, and timer means, said speed responsive means of said second generator and said timer means closing said second switch means in the event said first prime mover does not reach said predetermined speed level within a predetermined time period.

19. Apparatus as in claim 18, and further including third switch means responsive to voltage generated by said power windings of said second generator for connecting said first motor means for energization by voltage generated by said power windings of said second generator.

20. A control system for an AC generator connected to be driven by a prime mover, said generator comprising power windings, field windings, and exciter means for energizing said field windings, said system comprising circuit breaker means for connecting said power windings to AC power transmission lines, first means adapted to be connected to said prime mover and respond to a malfunction in said prime mover, second means acting in response to closure of said circuit breaker means for operating said exciter means at full level of energization, and enabling means cooperating with said circuit breaker means and responsive to said first means for enabling closure of said circuit breaker means in the absence of a malfunction, such closure of said circuit breaker means resulting in actuation of said exciter means by said second means to operate said exciter means, said enabling means also responding to said first means to open said circuit breaker means if previously closed in the event of a malfunction of said prime mover, such opening of said circuit breaker means resulting in actuation of said exciter means to cease operation of said exciter means.

21. A control system for an AC generator as in claim 20, and further including third means adapted to be connected to said prime mover and respond to the speed of said prime mover, said enabling means further being responsive to said third means and enabling closure of said circuit breaker means when said prime mover is operating at above a predetermined speed and opening said circuit breaker means in the event the speed of said prime mover falls below said predetermined speed.